Figure 1:
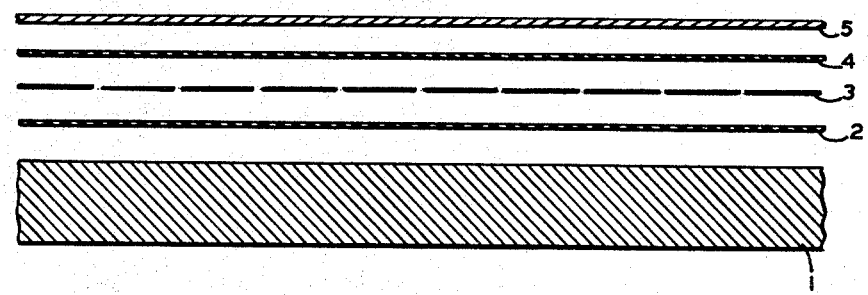

May 25, 1965  N. E. HAGER, JR  3,185,432
LOW-TEMPERATURE, LOW-PRESSURE MOLD
Filed Jan. 23, 1962

INVENTOR.
NATHANIEL E. HAGER, JR.
BY

3,185,432
LOW-TEMPERATURE, LOW-PRESSURE MOLD
Nathaniel E. Hager, Jr., Manheim Township, Lancaster County, Pa., assignor to Armstrong Cork Company, Lancaster, Pa., a corporation of Pennsylvania
Filed Jan. 23, 1962, Ser. No. 168,193
7 Claims. (Cl. 249—78)

This invention relates generally to molds and more particularly to low-temperature, low-pressure molds. Still more particularly this invention relates to molds wherein the heat needed to treat the material inside the mold is supplied by two opposing mold faces.

In the formation of certain cellular products, particularly polyurethanes, it is frequently desirable to form a cellular product having a large surface area as compared with its thickness. Such products might be referred to as thick sheets. A low-pressure mold is of great aid in shaping such a product. If, in addition to the shaping, the mold also supplies some heat to initiate and maintain the foaming action in the material, the product will possess unusual cellular uniformity, the desired low density, and unexpected homogeneity.

It is the primary object of the present invention to describe a lightweight mold which will achieve these desirable goals. It is a further object of the present invention to supply an inexpensive and easily made mold which is easy to handle and maintain, while at the same time being capable of producing a high-quality product.

These objects are attained in a surprisingly effective manner. The invention contemplates having two opposing mold walls which have large surface areas as compared with the remainder of the mold walls. These large mold walls supply the heat to the material being treated. Each comprises a rigid, thermally homogeneous, low-thermal-conductivity backing sheet. Electrically insulated therefrom is a thin, low output, low heat capacity, electrical heater in sheet form adapted to supply heat uniformly to the mold interior. In the side opposite the electrical heater from the backing sheet is a thin, metallic facing sheet.

The rigid backing sheet should be strong enough to maintain its shape during handling and under the temperature and pressure conditions encountered in use. The pressures will be low, ordinarily 5 pounds per square inch and under. Most backing sheets will be flat, although they certainly can be curved in order to produce a shaped product in a shape other than rectangular if desired. The rigid backing sheet should have a low thermal conductivity on the order of 2 B.t.u.-inch/hr.-ft.$^2$-° F. or less in order to minimize heat loss during warmup time. Additionally the backing sheet should be thermally homogeneous in order that it may transfer heat at a uniform rate in all its parts. This will help eliminate hot spots or cold spots. A variety of materials will serve as the rigid backing sheet for the heated mold wall of the present invention. Plywood is particularly satisfactory, for example in 0.5 or 0.75" thicknesses. A shaped mold can also be made of glass cloth impregnated with one or more bonding resins of the usual type, the resin being subsequently cured. Laminated asbestos sheets may also be used, although lower density asbestos materials are preferred in order to keep the thermal conductivity at a suitably low level. All of these materials may be made in various shapes or contours depending on the shape of the molded product to be formed.

The metallic face of the heated mold wall is that portion of the mold wall which actually comes into contact with the material being treated. Preferably the thin metal facing sheet should be made of aluminum or stainless steel. It should be thick enough to withstand handling and scraping without indentation and to help distribute the heat from the heater evenly, yet it should be thin enough to heat readily without requiring large amounts of energy. The thickness of the thin metal facing sheet will generally be in the range of 0.01–0.1", the thicker sheets within this range being used in those instances where less heating speed is acceptable. The thin metal facing sheet will follow the shape or contour of the rigid backing sheet. It may often be desirable to place a coating of polytetrafluoroethylene, silicones, or some other mold-release material on the face of the facing sheet in order that the material being treated may be released from the thin metal facing sheet with greater ease. An electrical ground connection to the thin metal facing sheet minimizes electrical shock hazard.

The electrical heater used in the present invention may be a laminated heating sheet as described in copending application Serial No. 132,496, now abandoned, incorporated herein by reference, or a heater made from metallic foil in serpentine pattern or configuration. Both types of heaters are in the form of a flat sheet which may be rectangular, round, or irregular in outline. Both have low mass. The laminated heating sheet described in the above-mentioned copending application comprises opposing, flat, conducting, metallic, sheet electrodes separated by a semiconducting layer. However, heaters made from metallic foils in serpentine shape are preferred, and the invention will be described with particular emphasis on such heaters.

Although the foil resistance heaters may be made of any conductive, metallic foil such as aluminum, stainless steel, and various alloys, copper is preferred. Copper foil having a thickness of about 0.0008" is a commercial item. Such foil may be cut into a serpentine pattern made of ribbons having widths in the range of 0.25–1.5" in width, each particular leg in the serpentine pattern being spaced from its neighbor by some small distance such as $\frac{1}{16}$". Metal foils used to make such serpentine resistance heaters should have a generally uniform thickness, say within about 5%, in order to give uniform heating.

Whichever kind of heater is used, it should be adapted to supply power in the range of about 10–50 watts per square foot. The voltage and amperage needed to achieve power outputs within this range may readily be calculated by methods known in the art. As mentioned earlier, the mold described herein is a low-temperature mold and is not designed to achieve temperatures above about 150° F. Greater or lesser power outputs within the limit stated will be required depending on the exact material to be treated.

A good average power level for the mold walls of the present invention is about 25 watts per square foot. Where molds using two 4 x 8' panels are utilized, a total of about 1600 watts for the whole system will be required. If such panels are connected in series directly to 120 volt line, each panel should have a resistance of about 4.5 ohms.. These resistances are readily achieved with a serpentine-shaped copper foil measuring 0.0008" in thickness having a ribbon width of about 1" spaced about $\frac{1}{16}$" apart.

The heater should be electrically insulated from the rest of the system. This insulation may be accomplished simply by adhering the heater to the rigid backing sheet where the backing sheet is itself an electrical insulator. However, the heater will always need to be electrically insulated from the metal facing sheet. Materials for accomplishing this insulation are readily available and may be made of thin films of poly(vinyl chloride), paper, glass cloth, polycarbonate films, or various polyester films such as polyethylene terephthalate sold under the trademark "Mylar." Most of these resinous films have dielectric strengths of the order of 300–500 volts/mil.

Therefore thickness of a few mils is more than adequate protection for 110 volt systems. The various films will be adhered to the backing sheet or the facing sheet or the heater by means of suitable adhesives. The adhesives will generally be contact-bond, thermoplastic, thermosetting, or chemically set adhesives which do not contain solvents at the time the opposing parts to be adhesively secured are placed in contact. Such solvents could not escape through metallic foils or through metal facing sheets and therefore should not be present.

Figure 2:
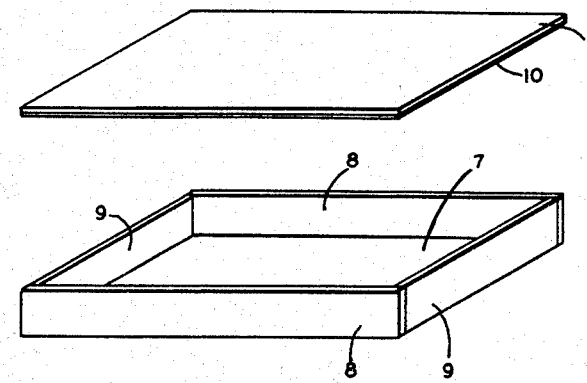
Figure 3:
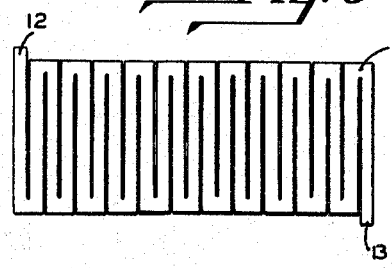

The invention will be more fully understood by reference to the attached drawings in which FIGURE 1 is a sectional view of the exploded components of the heating mold wall of the present invention;

FIGURE 2 is a simplified isometric view of the mold of the present invention; and FIGURE 3 is a plan view of a serpentine heater cut from metal foil.

Referring to FIGURE 1, the rigid backing sheet 1 may have affixed to it a layer of electrical insulation 2. The electrical heater 3 is secured to the insulation 2 on one side and another layer of electrical insulation 4 on the other side. The metal facing sheet 5 constitutes the interior facing of the mold wall.

FIGURE 2 shows the top mold wall 6 and the corresponding bottom mold wall 7, each of which is adapted to supply heat to the material to be treated in the mold interior. The remaining mold walls 8 and 9 possess an area small in comparison to the heated mold walls 6 and 7. In the present invention it is contemplated that the large mold walls will have an area of at least above five times the area of the remaining mold walls. The laminated heating sheet 10 may be used to supply heat in lieu of a serpentine heater.

In FIGURE 3 the serpentine heater 11 may have electrical connectors 12 and 13 to serve as a suitable means for passing current through the heater itself; these connectors may merely be extensions of the foil used in making the heater 10.

It will be appreciated that the mold of the present invention may operate in any of various positions. It may stand on edge or on end as well as lie flat in use. Since it is contemplated that only low pressures occur in the interior of the mold, the mold may be simply constructed. The top of the mold may be held in place by means of weights or by means of clamps or other suitable means. If the product be formed in the interior of the mold would benefit by having holes or openings molded therein, suitable inserts may be placed in the interior of the mold in order that the material being foamed will foam up around such inserts. Upon removal of the inserts, the desired opening will remain. The power supply to supply current to the resistance heater will be any of the known devices normally in use. If the same mold is expected to deliver varying amounts of heat to the material to be treated, then a variable transformer or other variable output device should be used. If the heat output of a given mold is to be fixed, it is an easy matter to design the two mold walls for the desired heat output using the usual electrical design considerations for resistance heaters.

I claim:

1. A low-temperature, low-pressure enclosing mold suitable for shaping and aiding the expansion of cellular plastics, said mold supplying heat to the material being molded by means of two opposing mold walls having large surface areas, at least five times the area of the remainder of the walls in the mold, each of said two large mold walls comprising
   (1) a rigid, thermally homogeneous low-thermal-conductivity backing sheet,
   (2) a thin metal facing sheet having a thickness in the range of 0.01–0.1 inch, and
   (3) a thin, low output, low heat capacity metal foil electrical heater adapted to supply heat uniformly to the mold interior at a temperature of less than about 150° F. positioned between said backing sheet and said facing sheet and electrically insulated therefrom.

2. A mold according to claim 1 wherein said electrical heater comprises a serpentine pattern made of metal foil.

3. A mold according to claim 1 wherein said electrical heater comprises a laminated heating sheet comprising opposing sheet electrodes of conductive metal foil separated by a semiconductive layer.

4. A mold according to claim 1 wherein said backing sheet comprises plywood.

5. A mold according to claim 1 wherein said thin metal facing sheet comprises aluminum.

6. A mold according to claim 1 wherein said backing sheet comprises plywood, said facing sheet comprises aluminum, and said heater comprises a serpentine heater of metal foil.

7. A low-temperature, low-pressure enclosing mold suitable for shaping and aiding the expansion of cellular plastics, said mold supplying heat to the material being molded by means of two opposing mold walls having large surface areas at least five times the area of the remainder of the walls in the mold, each of said two large mold walls including, in a direction from the exterior of the mold to the interior of the mold
   (1) a plywood backing sheet,
   (2) a thin layer of electrical insulation adhesively secured to the backing sheet,
   (3) a serpentine metal foil resistance heater adhesively secured to said electrical insulation and adapted to supply heat uniformly to the mold interior at a temperature of less than about 150° F.,
   (4) a second sheet of electrical insulation adhesively secured to said serpentine heater, and
   (5) a metal facing sheet having a thickness in the range of 0.01–0.1 inch adhesively secured to said second electrical insulation sheet.

References Cited by the Examiner

UNITED STATES PATENTS

| 1,287,192 | 12/18 | Berry | 219—34 |
| 2,271,498 | 1/42 | Overstreet | 18—53 |
| 2,317,597 | 4/43 | Ford et al. | 18—38 |
| 2,458,184 | 1/49 | Marick | 219—34 |
| 2,572,163 | 10/51 | Lamb | 219—34 |
| 2,878,523 | 3/59 | Hardy | 264—54 XR |

MICHAEL V. BRINDISI, *Primary Examiner.*

ROBERT F. WHITE, *Examiner.*